United States Patent [19]

Harris et al.

[11] Patent Number: 4,965,310

[45] Date of Patent: Oct. 23, 1990

[54] WEAR RESISTANT POLY (ARYL ETHER KETONE) POLYIMIDE BLENDS

[75] Inventors: James E. Harris, Piscataway; John P. Gavula, Lebanon, both of N.J.

[73] Assignee: Amoco Corporation, Chicago, Ill.

[21] Appl. No.: 758,774

[22] Filed: Jul. 25, 1985

Related U.S. Application Data

[63] Continuation-in-part of Ser. No. 716,401, Mar. 27, 1985, abandoned.

[51] Int. Cl.⁵ .................... C08J 3/10; C08L 79/08
[52] U.S. Cl. .................... 524/406; 524/538; 525/153; 525/436; 252/12
[58] Field of Search .............. 525/436, 153; 524/406, 524/538

[56] References Cited

U.S. PATENT DOCUMENTS

| | | | |
|---|---|---|---|
| 3,179,632 | 4/1965 | Hendrix et al. | 525/436 |
| 3,324,199 | 6/1967 | Tocker | 525/150 |
| 3,505,168 | 4/1970 | Dunphy et al. | 428/473.5 |
| 3,652,409 | 3/1972 | Mack et al. | 252/12 |
| 3,689,464 | 9/1972 | Holub et al. | 525/422 |
| 3,708,458 | 1/1973 | Alberino et al. | 528/67 |
| 3,733,302 | 5/1973 | Klebe et al. | 525/534 |
| 3,737,478 | 6/1973 | Boldebuck | 525/421 |
| 3,770,697 | 11/1973 | Holub et al. | 528/203 |
| 3,773,718 | 1/1973 | Klebe et al. | 528/170 |
| 3,892,716 | 7/1975 | Boldebuck | 528/81 |
| 3,897,395 | 7/1975 | D'Alelio | 526/263 |
| 3,929,713 | 12/1975 | D'Alelio | 528/319 |
| 3,998,786 | 12/1976 | D'Alelio | 526/70 |
| 4,026,833 | 5/1977 | D'Alelio | 521/157 |
| 4,250,279 | 2/1981 | Robeson et al. | 525/425 |
| 4,293,670 | 10/1981 | Robeson et al. | 525/436 |
| 4,360,633 | 11/1982 | Bolon et al. | 524/845 |
| 4,389,516 | 6/1983 | Sugio et al. | 525/534 |
| 4,419,486 | 12/1983 | Rose | 525/534 |
| 4,430,484 | 2/1984 | Quinn | 525/425 |

FOREIGN PATENT DOCUMENTS 58-57848 10/1984 Japan .
59-184254 10/1984 Japan .
59-187054 10/1984 Japan .

OTHER PUBLICATIONS

Billmeyer, "Properties of Commercial Polymers", Textbook of Polymer Science, p. 442 (1962).
M. P. Wolverton et al., Machine Design, Feb., 1983, pp. 111-115.
Kirk—Othmer, Encyclopedia of Chemical Technology, 3rd Ed., vol. 18, pp. 704-719.
C. Arnold, Jr., J. Poly Sci.; Macromolecular Rev., vol. 14, 1979, pp. 265-378.

*Primary Examiner*—Ana L. Carrillo
*Attorney, Agent, or Firm*—William H. Magidson; Ralph C. Medhurst

[57] ABSTRACT

Blends comprising
(A.) at least one poly(aryl) ether ketone), and
(B.) at least one polyimide having repeating units of the formula

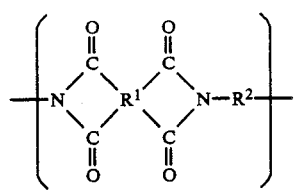

(I)

wherein
$R^1$ is a substituted or unsubstituted tetravalent radical having benzenoid unsaturation, and
$R^2$ is a substituted or unsubstituted divalent group having aromatic unsaturation which is essentially free of (i) backbone ether oxygen bonded directly to the aromatic ring forming an imide linkage and (ii) amide linkages bonded through carboxyl groups bonded to the aromatic ring forming an imide linkage. The blends exhibit good melt processability and wear resistance greater than the individual blend components.

12 Claims, 1 Drawing Sheet

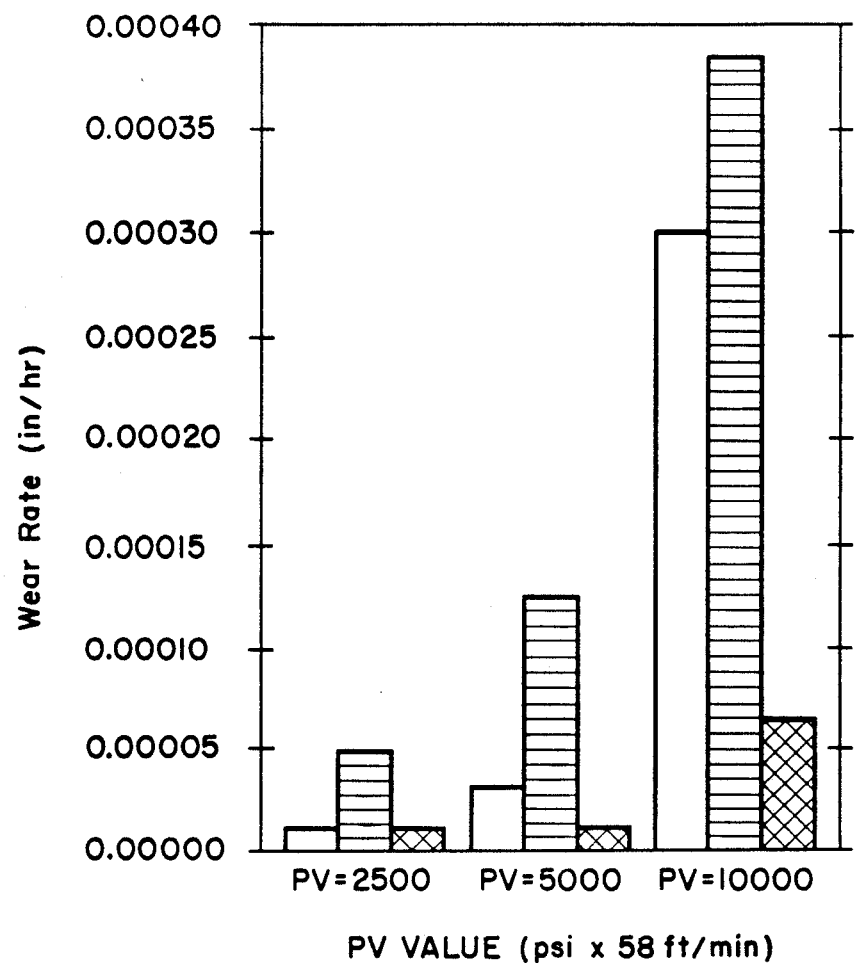
WEAR RATES FOR A POLY (ARYLETHER KETONE)/POLYIMIDE BLEND AS A FUNCTION OF PV (PRESSURE x VELOCITY) IN COMPARISON TO ITS CONSTITUENTS
 ICI PEEK
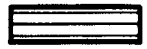 UP JOHN-2030
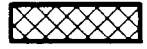 75% PEEK  25% UP JOHN-2080

WEAR RESISTANT POLY (ARYL ETHER KETONE) POLYIMIDE BLENDS

This is a Continuation-In-Part of Ser. No. 716,401 filed Mar. 27, 1985 now abandoned.

FIELD OF THE INVENTION

This invention relates to wear resistant blends of a poly(aryl ether ketone) and a polyimide which are useful in the manufacture of wear resistant articles such as bearings, seals, and backup rings.

BACKGROUND OF THE INVENTION

A significant market opportunity exists in molded or shaped articles fabricated from wear resistant thermoplastic polymers and blends of thermoplastic polymers capable of functioning in high friction mechanical environments. M. P. Wolverton et al. in *Machine Design*, Feb., 1983, pp. 111-115, notes that the displacement of metals by thermoplastic materials in many gear and bearing applications is dependent upon performance and cost constraints. The article also notes that the property of thermoplastic articles to absorb shock and vibration and to operate at low noise and power consumption levels provides an advantage in such applications. The authors concluded that PEEK composites are particularly suited for elevated temperature applications and that a polyetherimide composite demonstrated flow at the same elevated temperature. PEEK with a Tm of 335° C. was operative in a composite at 200° C. and 260° C. whereas the polyetherimide, which is amorphous, failed because of its low Tg.

Polyimides are a well known class of plastics. They are amply described by Kirk-Other, *Encyclopedia of Chemical Technology*, 3rd Ed., Vol. 18, pp. 704-719. C. Arnold, Jr., *Journal of Polymer Science*; Macromolecular Reviews, vol. 14, 265-378 (1979) devotes a portion of his article entitled: "Stability of High-Temperature Polymers," at pp. 322-333, to polyimides. The physical and chemical characteristics of polyimides have been well documented.

According to Alberino et al., U.S. Pat. No. 3,708,458, a polyimide of the reccurring unit formula

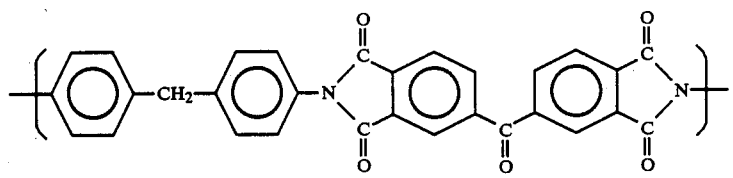

"possesses highly useful structural strength properties but suffers the disadvantage that it has a relatively low glass transition point and, hence, relatively low resistance to loss of structural strength on exposure to high temperatures. Further, the polyimide in question is difficult to mold, by compression at elevated temperatures, because of its relatively poor flow properties in the mold." The patentees developed a polyimide to overcome to an extent these difficulties by including in the polymer backbone a certain proportion of the reaction product of 3,3',4,4'-benzophenone tetracarboxylic dianhydride with 2,4- or 2,6-toluene diamine (or the corresponding diisocyanates). The copolymers are regarded to have better flow properties in the mold by such difficult molding procedures as "sintering or hot pressing."

U.S. Pat. No. 3,652,409, to Mack et al., provides a bearing composition of polytetrafluoroethylene resins and a broad class of polyimide resins. Mack et al. note that "neither component alone, whether TFE resin or polyimide resin, has satisfactory bearing resistance particularly when moving against a soft metal such as brass."

Recently the processability of polyimides has been improved by blending or alloying them with other resins which are themselves more easily melt processable by virtue of being more easily thermoformed and injection molded. For example, U.S. Pat. No. 4,293,670 to Robeson et al., assigned to the present assignee, discloses blends of polyarylether resins and polyetherimide resins having excellent mechanical compatibility and good impact strength and environmental stress crack resistance. U.S. patent application Ser. No. 448,376 filed on Dec. 9, 1982 (now abandoned) in the name of J. E. Harris, assigned to the present assignee, involves blends of a poly(aryl ether), a poly(etherimide) polymer, a fiber, and a filler. U.S. patent application Ser. No. 537,042 filed on Sept. 29, 1983 (now abandoned) in the name of J. E. Harris et al., assigned to the present assignee, involves blends of a select polyarylketone and a polyetherimide. U.S. patent application Ser. No. 626,105 filed on June 29, 1984 in the name of J. E. Harris et al., assigned to the present assignee, involves blends of a polyamideimide and a poly(aryl ether ketone).

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, vol. 5, 1967, pp. 2415-2427, Johnson et al., U.S. Pat. Nos. 4,108,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, vol 22, August, pp. 1096-1103; Blundell et al., Polymer, 1983 vol. 24, August, pp. 953-958, Atwood et al., Polymer Preprints, 20, no. 1, Apr. 1979, pp. 191-194; and Rueda et al., Polymer Communications, 1983, vol. 24, September, pp. 258-260. In early to mid-1970, Raychem Corp. commercially introduced a PAEK called STILAN ™, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers and thus would be classed as expensive polymers.

European Patent Application No. 125,816, filed Apr. 19, 1984, based for priority upon British Patent Application No. 8,313,110, filed May 12, 1983, is directed to a method for increasing the molecular weight by melt polymerization of a poly(aryl ether) such as PEEK.

The process of European Patent Application No. 125,816, provides a basis by melt polymerization above the crystalline melting point of the poly(aryl ether) to increase the molecular weight by chain extension of polymer blocks. The application theorizes that the procedure can be used for making the block copolymers described in U.S. Pat. Nos. 4,052,365 and 4,268,635. Implicit problems associated in the process of this application are the difficulty in controlling molecular weight of the resulting polymer and/or limiting isomerization and the problems associated with branching. The process of this European application would appear to be advantageous in making composites where the linearity and solution properties of the resulting polymer are not so critical.

PAEK block copolymers have been described in U.S. Pat. Nos. 4,052,365 and 4,268,635. U.S. Pat. No. 4,052,365 describes random or block copolymers having repeating units of the structure —Ar—O—Ar—CO and —Ar—O—Ar—SO$_2$—. The patent states that these block copolymers are crystalline. U.S. Pat. No. 4,268,635 describes a process for preparing polymers containing —Ar—O—Ar—SO$_2$— and —Ar—O—Ar—CO— units which the patentee believes to contain block structures. The patent states that the polymers are crystalline and exhibit improved high temperature properties compared with totally random copolymers of similar composition. However, the block copolymers in said patents require units with —SO$_2$— linkages. The —SO$_2$— linkage tends to break up the crystallinity of the polymer which results in inferior properties as compared to polymers which do not contain the —SO$_2$— linkage but have ether and/or keto groups instead. Due to the amorphous nature of the sulfonyl containing component used in making these prior art block copolymers, lower rates of crystallization are induced and hence, their commercial utility is less than desirable. The —SO$_2$— component so adversely affects the crystallinity properties that there is a maximum limit in the $T_m$, far below that for the block polymers suitable for use in this invention. A further deficiency of these prior art block copolymers is that they cannot be used to form compatible blends with other PAEKs.

SUMMARY OF THE INVENTION

The present invention provides blends comprising a poly(aryl ether ketone) and a polyimide essentially free of (i) backbone ether bonded directly to the aromatic ring forming an imide linkage and/or (ii) amide linkages bonded through carboxyl groups bonded to the aromatic ring forming an imide linkage. More specifically, the blends comprise
(a) at least one PAEK and
(b) at least one thermoformable polyimide having repeating units of the formula

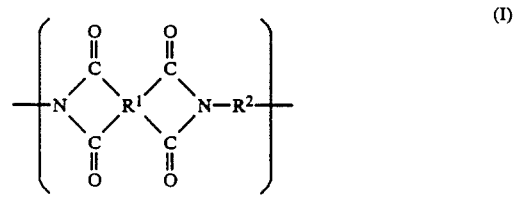

wherein
R$^1$ is a substituted or unsubstituted tetravalent radical having aromatic unsaturation, and
R$^2$ is a substituted or unsubstituted divalent group having aromatic unsaturation which is essentially free of (i) backbone ether oxygen bonded directly to the aromatic ring forming an imide linkage and (ii) amide linkages bonded through carboxyl groups bonded to the aromatic ring forming an imide linkage.

Surprisingly, the blends of this invention exhibit greater wear resistance than the unblended components which comprise them. The inclusion of a poly(aryl ether ketone) also imparts excellent melt processability to the blend not exhibited by the polyimide alone such that the blends are readily thermoformable and in some cases are readily melt processable by standard extrusion and injection molding techniques. The blends are also readily amenable to the inclusion of fillers.

BRIEF DESCRIPTION OF THE FIGURE

FIG. 1 is a bar graph comparing the wear rate (i.e. the volumetric loss of material per unit of time) of a PAEK, a polyimide and a 75/25 weight % blend of the two.

DETAILED DISCUSSION

A. Polyimides

The polyimides used to make the blends of this invention are well known in the art. They are desirably essentially aromatic with the exception of the imide, alkylene, and the like, groups therein.

The typical polyimides useful in this invention have the structure (I) described above. Such polyimides may be homopolymers having only one type of repeat unit (I), i.e. where $R^1$ and $R^2$ are the same in each repeat unit. The polyimides may also be copolymers of different repeat units each of which is a species of (I), i.e., a copolymer wherein $R^1$ and $R^2$ can vary along the polyimide backbone so long as $R^1$ and $R^2$ retain the generic meanings given above.

Polyimides having structure (I) may be made conventionally as well known in the art. For example the polyimides may be made by reacting, at temperatures ranging from ambient to about 175° C., an organic diamine having the formula

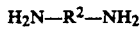

with a tetracarboxylic acid dianhydride of the formula

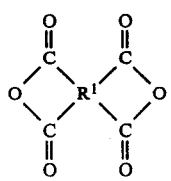

(II)

wherein $R^1$ and $R^2$ are as previously defined. Such reaction yields the corresponding polyamide acid, for example

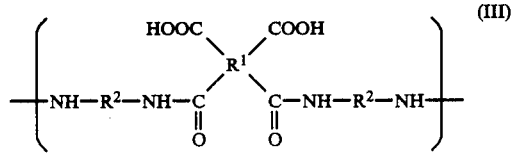

(III)

The corresponding polyimide (I) may then be obtained by dehydrating the polyamide acid (III) so obtained in a polar solvent to effect ring closure, preferably at elevated temperatures of 200° C. or higher, for example by treatment with an acid anhydride such as acetic anhydride, propionic anhydride, or benzoic anhydride, and preferably in the presence of a tertiary amine such as pyridine or N,N-dimethylanaline. Examples of suitable polar solvents are dimethylformamide, dimethylacetamide, dimethylsulfoxide, N-methylpyrrolidone, and m-cresol. The ring closure can also be effected using heat alone.

Alternatively, the above tetracarboxylic acid anhydrides (II) can be reacted with a diisocyanate,

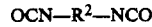

$R^2$ having the meaning previously given, in place of the diamine. Reaction of isocyanate with the anhydride group yields a seven-member cyclic intermediate which spontaneously collapses to form the imide with spontaneous evolution of $CO_2$.

Illustrative of references which describe and/or exemplify procedures for making polyimides suitable for use in the blends of this invention are U.S. Pat. Nos.

| | | |
|---|---|---|
| 3,708,458 | 3,179,631 | 2,731,447 |
| 3,652,409 | 3,179,630 | 2,712,543 |
| 3,179,634 | 3,105,775 | 2,710,853 |
| 3,179,632 | 3,037,966 | |

Scroog et al., J. Poly. Sci. Part A, Vol. 3, 1373-1390, 1965.

Many of the polyimides are also readily commercially available.

$R^1$ groups are substituted or unsubstituted tetravalent radicals having aromatic unsaturation and may be derived from the corresponding tetracarboxylic acid dianhydrides. The following are representative examples:
pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl)sulfone dianhydride;
3,4,9,10-perylene tetracarboxylic dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetrarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride;
benzene-1,2,3,4-tetracarboxylic dianhydride;
3,3',4,4'-benzophenone tetracarboxylic dianhydride;
Preferred $R^1$ groups include tetravalent phenyl, napthyl and diphenyl.

Also preferred are groups having the formula

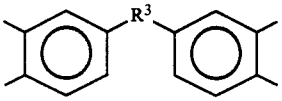

(IV)

wherein $R^3$ is

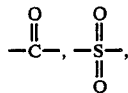

—S—, or a divalent substituted or unsubstituted $C_{1-6}$ alkyl group including such $R^3$ groups as —$CH_2$—, —$CH_2CH_2$—, —$CH_2$—$CH_2$—$CH_2$—, and

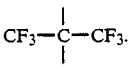

$R^2$ corresponds to a substituted or unsubstituted divalent group having aromatic unsaturation which can be a residuum derived from a diamine or the corresponding diisocyanate. The following are diamine compounds listed for their $R^2$ groups, that is, the residua which are exclusive of the two amino groups.

meta-phenylene diamine
para-phenylene diamine
4,4'-diamino-diphenyl propane.
4,4'-diamino-diphenyl methane
bis-(4-amino-phenyl)-N-methylamine
1,5-diamino naphthalene
3,3'-dimethyl-4,4'-diamino-biphenyl benzidine
3,3'-dimethoxy benzidine
2,4-bis(para-beta-amino-t-butyl) toluene
para-bis (2-methyl-4-aminopentyl) benzene
para-bis-(1,1-dimethyl-5-aminopentyl) benzene
m-xylylene diamine
p-xylylene diamine $R^1$, $R^2$, and $R^3$, as noted, may be substituted or unsubstituted, that is they may contain substituents which are not incorporated directly in the polymer backbone but which are pendant therefrom. The substituents must be inert, that is they should be unreactive during the polymerization and, particularly, should not react to crosslink the polymer and thereby destroy its thermoformable character. Suitable substituents are alkyl groups having 1 to about 6 carbon atoms (e.g. methyl, ethyl, propyl, isopropyl, hexyl, etc.), the alkoxy analogs thereof (e.g. methoxy, ethoxy, propyoxy, isopropyloxy, hexyloxy, etc.) and halogen (F, Cl, Br, and I).

The above diamines (and analogous diisocyanates thereto) and dianhydrides are exemplary and are cited as suitable because of their ability to form polyimides while contributing $R^1$ and $R^2$ groups within the scope of the invention to the polymer backbone. Although these classes of reactants have been cited because they are conventionally used, the polyimides suitable in this invention are not to be construed as limited to those made only from diamines or diisocyanates, reacted with dianhydrides. Any other method known to the art for making polyimides within the scope of the appended claims is also considered to be within the scope of the invention.

B. Poly(aryl ether Ketone)

The crystalline poly(aryl ether ketones) which are suitable for use herein are thermoplastic materials and can be generically characterized as containing repeating units of one or more of the following formulae:

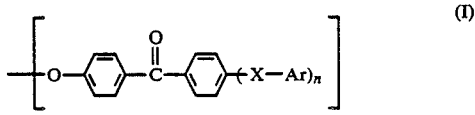 (I)

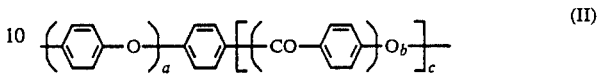 (II)

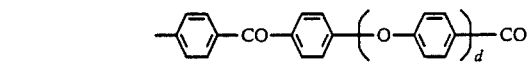

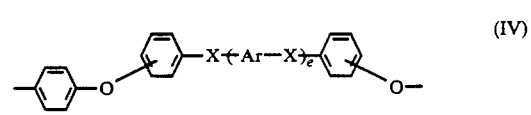 (III)

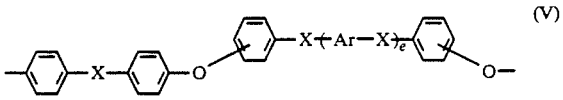 (IV)

(V)

wherein Ar is independently a divalent aromatic radical selected from phenylene, biphenylene or naphthylene, X is independently —O—,

or a direct bond and n is an integer of from 0 to 3, b, c, d and e are 0 to 1 and a is an integer of 1 to 4 and preferably d is 0 when b is 1.

Preferred poly(aryl ether ketones) include those having repeating units of the formula:

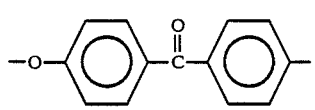

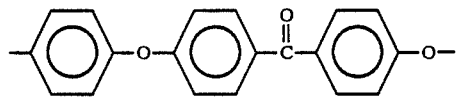

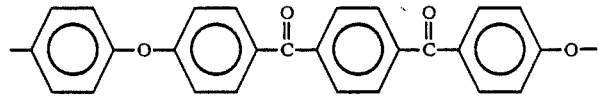

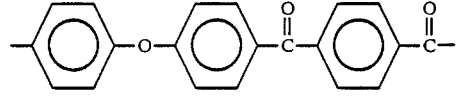

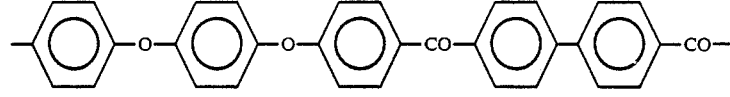

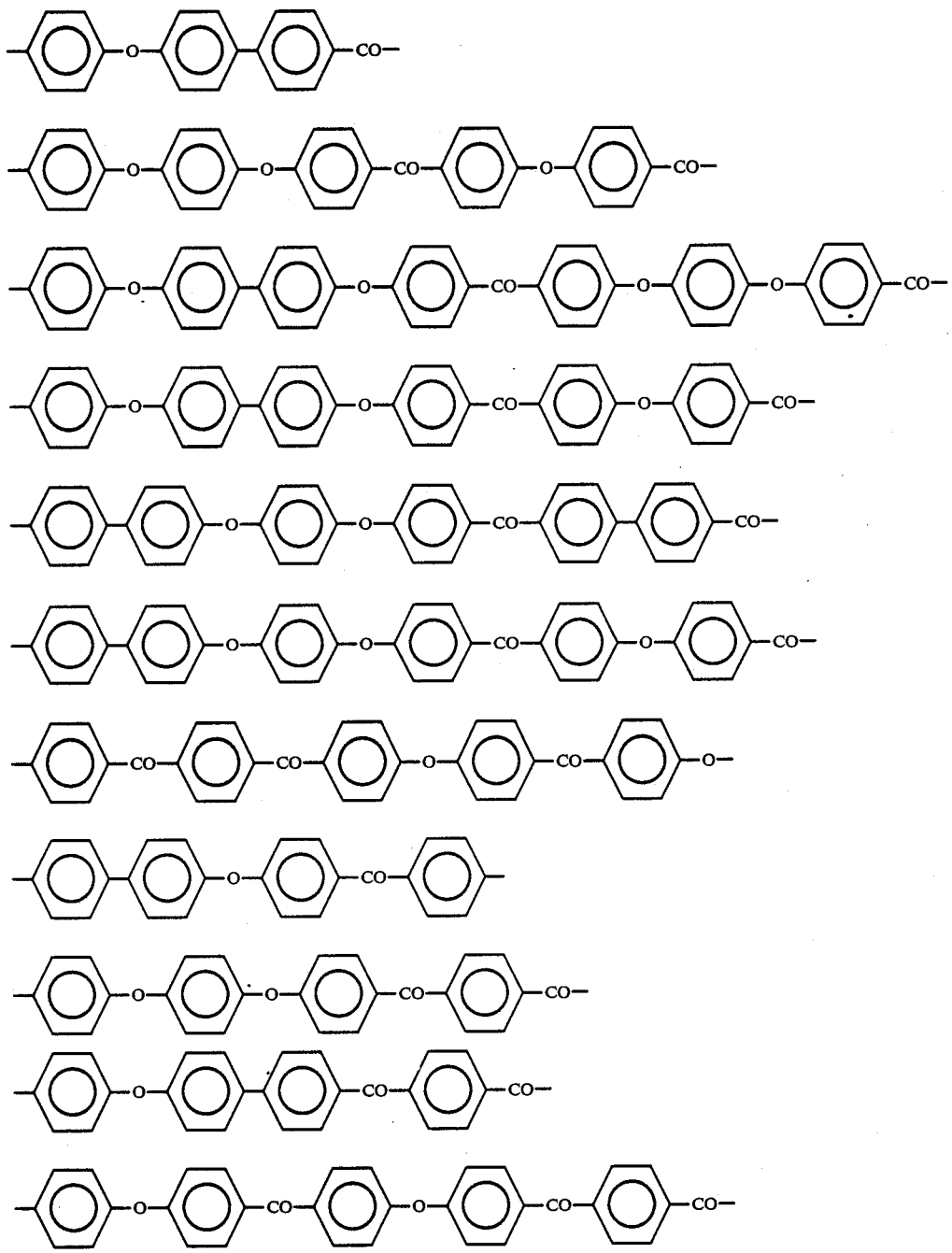

These poly(aryl ether ketones) are prepared by methods well known in the art. One such method comprises heating a substantially equimolar mixture of at least one bisphenol and at least one dihalobenzoid compound or at least one halophenol compound. Preferred bisphenols in such a process include:
- hydroquinone,
- 4,4'-dihydroxybenzophenone,
- 4,4'-dihydroxybiphenyl, and
- 4,4'-dihydroxydiphenyl ether.

Preferred dihalo and dihalobenzoid compounds include:
- 4-(4-chlorobenzoyl)phenol,
- 4,4'-difluorobenzophenone,
- 4,4'-dichlorobenzophenone,
- 4-chloro-4'-fluorobenzophenone,

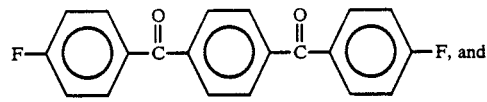

F, and

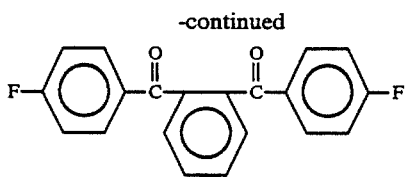

The poly(aryl ether ketones) may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketones) such as those containing repeating units of the formula:

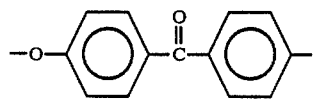

may be produced by Friedel-Craft reactions utilizing hydrogen fluoride-boron trifluoride catalysts as described, for example in U.S. Pat. No. 3,953,400.

Additionally, polyaryl ketones of the following formula:

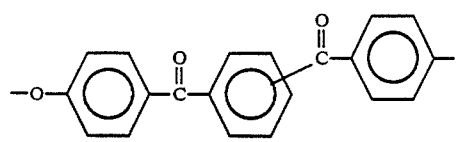

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In such process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ether ketones) of the following formulas:

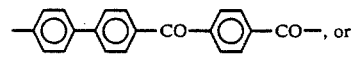

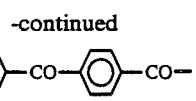

may also be prepared according to the process as described in, for example, U.S. Pat. No. 4,398,020. In such a process, (a) a mixture of substantially equimolar amounts of
(i) at least one aromatic diacyl halide of formula

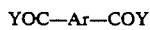

where —Ar— is a divalent aromatic radical, Y is halogen and COY is an aromatically bound acyl halide group, which diacyl halide is polymerizable with at least one aromatic compound of (a)(ii), and (ii) at least one aromatic compound of the formula

wherein —Ar'— is a divalent aromatic radical and H is an aromatically bound hydrogen atom, which compound is polymerizable with at least one diacyl halide of (a)(i)

(b) at least one aromatic monoacyl halide of formula

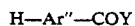

where —Ar"— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkene sulphonic acid.

The term poly(aryl ether ketone) as used herein is meant to include homopolymers, copolymers, terpolymers, graft copolymers, and the like. For example, any one or more of the units (I) to (V) may be combined to form copolymers, etc.

The poly(aryl ether ketones) have a reduced viscosity of at least about 0.4 to about 5.0 dl/g, preferably from about 0.9 to about 1.5 dl/g., as measured in concentrated sulphuric acid at 25° C. (1 gm/100 ml).

The polyimide and poly(aryl ether ketone) (PAEK) may be blended by any method which results in the efficient dispersion of the polyimide throughout the PAEK. In a preferred method PAEK in powder or granular form having a small particle size, preferably a size whose volume is smaller than about 10 mm³, is combined with a solution of polyimide in, for example, N-methylpyrrolidone, in a vented compounding extruder equipped for volatilization (commercially available, for example, from Killion Extruder, Verona, New Jersey). The PAEK will generally be poorly soluble or completely insoluble in organic solvents so that a slurry results from combining PAEK with the polyimide solution. The extruder barrel temperature should be such as to volatilize the polyimide solvent and be above the melting point of all PAEK components (if more than one PAEK is employed) to promote good mixing. Generally such temperature will range from about 300° to about 400° C. depending on the polyimide, solvent, and PAEK employed. The extrudate thus obtained will appear as a uniform dispersion, i.e. a blend.

The invention encompasses blends comprising at least one polyimide and at least one poly(aryl ether ketone).

Blends containing more than one polyimide and more than one PAEK are thus specifically contemplated.

An amount of polyimide should be employed which is sufficient to achieve a weight percentage of from about 2 to about 50% weight % in the finished blend, and preferably from about 10 to about 35 weight %, based on the (unfilled) weight of all PAEK and polyimide components used to make the blend.

Fillers known to the blending art may also be added to the blend components and, advantageously, can increase the lubricity of articles formed from the filled blend and thus enhance the wear resistance of articles fabricated therefrom. Preferred as fillers are particulate polytetrafluoroethylene, molybdenum disulfide, graphite and carbon fibers. The weight % of filler employed will, of course, depend to a certain extent on the particular application contemplated and physical properties desired, but will generally range between about 5 and about 50 weight % based on the weight of the filled blend.

The extrudate ultimately obtained is thermoformable and is often readily amendable to the fabrication of wear resistant articles by conventional melt processing techniques such as injection molding. The extrudate is advantageously formed as storable pellets, but may also take other desirable forms, e.g. powder, granules, fluff, etc.

Useful articles including bearings, bearing sleeves, back-up rings, and seals can be readily formed as known in the art from the blends of this invention. An article such as a bearing sleeve can, for example, be extruded as a hollow tube. Articles such as bearings can be injection-molded by injecting the blend, at a temperature above the $T_m$ of the PAEK or PAEK's employed, into a mold having the desired bearing shape. In any case, where it may be desired or necessary to use a compression molding procedure, those procedures known conventionally to the art may be used, for example as disclosed in U.S. Pat. No. 3,652,409.

The invention is further illustrated and described by the following examples which are not, however, to be taken as limiting the scope of the invention.

CONTROL A

Pellets of a poly(arylether ketone) of the structural formula:

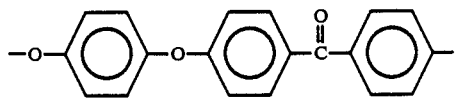

PAEK I (R.V.=1.2 dl/g as measured in concentrated sulfuric acid at 25° C., 1 wt. % polymer solution) were injection molded into ASTM test specimens in a Newbury 1½ ounce reciprocating injection molding machine at about 370° C. The samples were tested for tensile strength, tensile modulus, and percent elongation at break according to ASTM D-638; notched Izod impact strength according to ASTM D-256; and tensile impact according to ASTM D-1822. Pellets were also tested for melt flow using a method similar to ASTM D-1238 using a Tinius-Olsen Extrusion Plastometer. The conditions were 400° C. with a pressure of 43.25 psi. The results of these tests are given in table I. The wear rates of PAEK I were also determined using a Falex Model No. 6 thrust washer test machine manufactured by Faville-LaValley Corp., Downers Grove, IL, according to ASTM D-3702 with the following exception:

Section 3.1—A 2:1 lever was used instead of a 10:1.

Section 5.3—The stationary washer had a hardness of Rc 29±1.

Section 7.1—The surface of the stationary washer was polished with rubwet silicon Carbide paper, No. 400.

Section 7.9—The formula was $$W = \frac{F}{2}$$

Test specimens were compression molded at about 400° C.

The testing was done under ambient conditions, approximately 23° C. 50% R.H. The test results are shown in FIG. 1.

CONTROL B

A polyimide powder of structural formula:

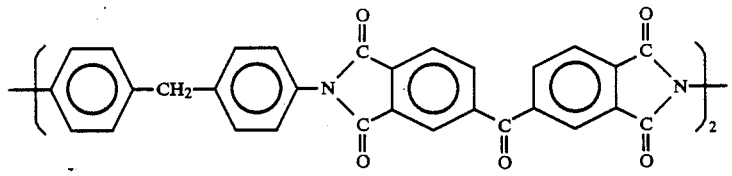

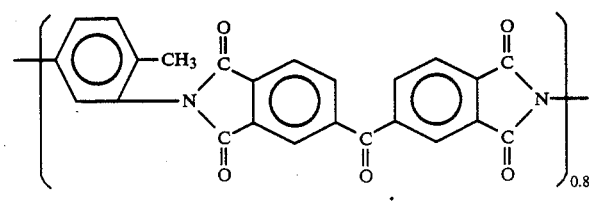

PI 1

UpJohn 2080, obtained from the UpJohn Chemical Company, North Haven, Ct, was compression molded at about 400° C. into thrust washer test specimens and tested for wear as in Control A above. The results are shown in the FIGURE. ASTM test specimens were not injection molded as this polymer is not melt processible except by compression molding. This material had no melt flow as measured in Control A above.

EXAMPLE I

The polyimide (PI 1) of Control B was dissolved in N-methylpyrollidone (NMP) to make a 30% by weight polymer solution. To this solution was added enough PAEK of Control A so that the weight % ratio of PAEK 1 to PI 1 was 75/25. The PAEK did not dissolve in the NMP, but was ground into a fine powder prior to addition so that the mixture was a slurry. This slurry was fed to a single screw one inch diameter twin vent extruder (L/D=36). The barrel temperature was about 360° and the first vent was connected to a water-cooled condenser while the second vent was connected to a vacuum pump equipped with a dry ice/methylene chloride vapor trap. In this manner the NMP was separated from the resulting extrudate which was a 75/25 PAEK I/PI I blend. The blend was injection molded and tested as in Control A. The results are given in Table I. The blend was also compression molded into thrust washer test specimens and tested for wear rate as in Control A and B above, the results being shown in the FIGURE.

TABLE I

| Composition | 75% PEEK 25% UPJOHN 2080 | Control 100% PEEK (Fully Crystallized) |
|---|---|---|
| Tensile Strength (psi) | 13,800 | 12,200 |
| Tensile Modulus (psi) | 540 | 540 |
| % Elongation | 31 | 34 |
| Notched Izod (ft-lb$_f$/in$^2$) | 1.6 | 1.2 |
| Tensile Impact (ft-lb$_f$/in$^2$) | 75 | 102 |
| HDT (°C.) (264 psi, 1/8") | 151 | 160 |
| Melt Flow (400° C., 1 P) | | |
| MF$_{10}$ (dg/min) | 1.6 | 3.5 |
| MF$_{30}$ (dg/min) | 1.3 | 3.3 |
| MF$_{30}$/MF$_{10}$ | 0.80 | 0.95 |

What is claimed is:

1. A blend comprising
   A. at least one poly(aryl ether ketone), and
   B. at least one thermoplastic polyimide having repeating units of the formula

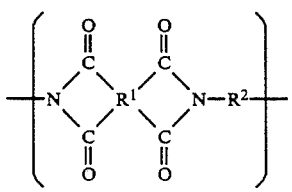
(I)

wherein
R$^1$ is a tetravalent radical having benzenoid unsaturation, and
R$^2$ is a divalent group having aromatic unsaturation, which polyimide is essentially free of (i) backbone ether oxygen bonded directly to the aromatic ring forming an imide linkage and (ii) amide linkages bonded through carboxyl groups bonded to the aromatic ring forming an imide linkage.

2. The blend of claim 1 wherein said polyimide is present in the amount of about 2 to about 50 weight percent based on the weight of A and B.

3. The blend of claim 1, wherein said polyimide is present in an amount between about 10 and 35 weight percent based upon the weight of A and B.

4. The blend of claim 1, additionally comprising a filler.

5. The blend of claim 4, wherein said filler is selected from the group consisting of particulate polytetrafluoroethylene, molybdenum disulfide, graphite and carbon fibers.

6. The blend of claim 4, wherein said filler is present in an amount between about 5 and about 50 weight % based on the weight of the filled blend.

7. The blend of claim 1 wherein the poly(aryl ether ketone) contains repeating units of one or more of the following formulae:

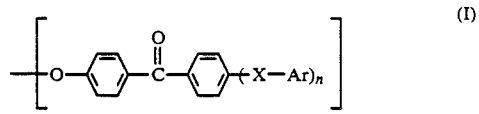
(I)

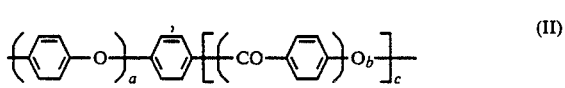
(II)

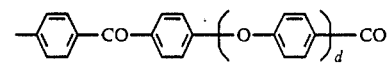

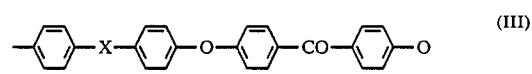
(III)

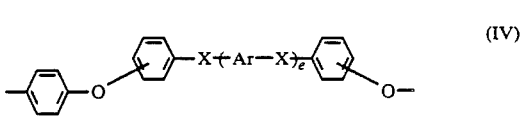
(IV)

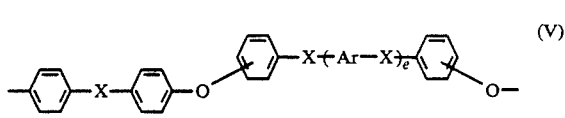
(V)

wherein Ar is independently a divalent aromatic radical selected from phenylene, biphenylene or naphthylene, X is independently —O—,

or a direct bond and n is an integer of from 0 to 3, b, c, d and e are 0 to 1 and a is an integer of 1 to 4.

8. A blend as defined in claim 7 wherein the poly(aryl ether ketones) have repeating units of one or more of the following formula:

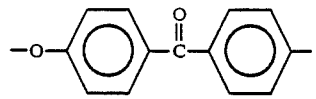

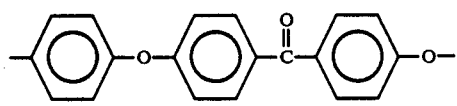
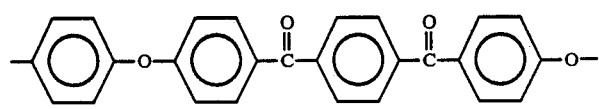
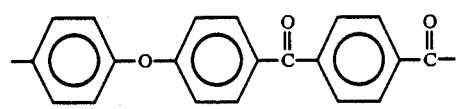
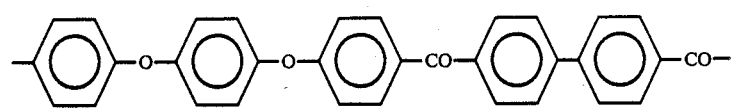
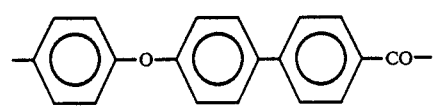
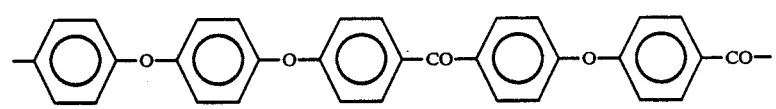
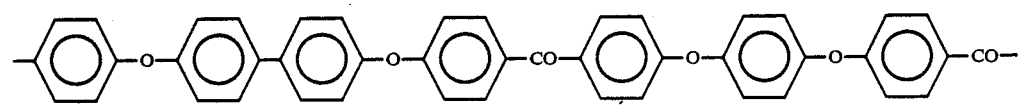
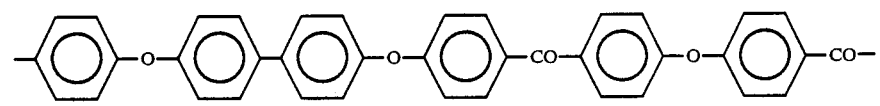
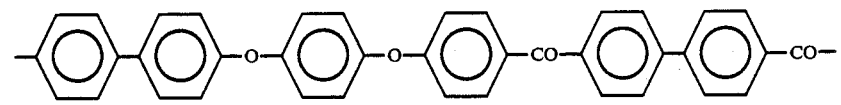
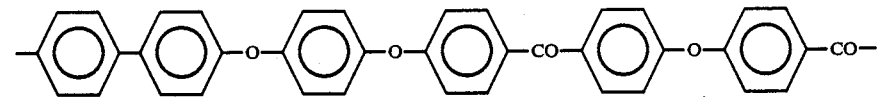
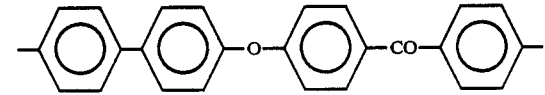
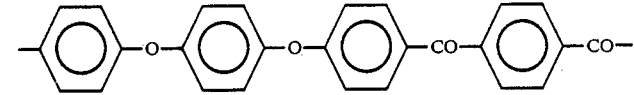
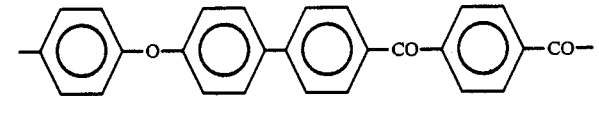

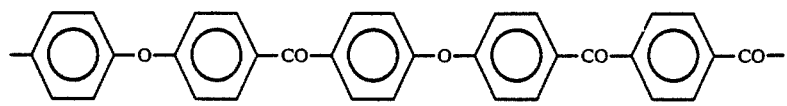
9. A shaped article formed from the blend of claims 1 or 7.
10. A shaped article as defined in claim 9 in the form of a bearing.
11. A shaped article as defined in claim 9 in the form of a seal.
12. A shaped article as defined in claim 9 in the form of a backup ring.
* * * * *